United States Patent
Darredeau et al.

(10) Patent No.: US 6,395,138 B1
(45) Date of Patent: May 28, 2002

(54) LIQUID DISPENSER FOR DISTILLING COLUMN, AND CORRESPONDING DISTILLING COLUMN

(75) Inventors: Bernard Darredeau, Sartrouville; Jean-Yves Lehman, Maisons-Alfort, both of (FR)

(73) Assignee: L'Air Liquide, Societe Anonyme a Directoire et Conseil de Surveillance pour l'Etude et l'Exploitation des Procedes Georges Claude, Paris (FR)

(*) Notice: Subject to any disclaimer, the term of this patent is extended or adjusted under 35 U.S.C. 154(b) by 0 days.

(21) Appl. No.: 09/554,584
(22) PCT Filed: Nov. 9, 1998
(86) PCT No.: PCT/FR98/02390
§ 371 (c)(1), (2), (4) Date: May 17, 2000
(87) PCT Pub. No.: WO99/25447
PCT Pub. Date: May 27, 1999

(30) Foreign Application Priority Data

Nov. 17, 1997 (FR) .......................................... 97 14382

(51) Int. Cl.$^7$ ................................................ B01D 3/00
(52) U.S. Cl. ................... 202/158; 62/238.5; 196/111; 196/135; 202/83; 261/19; 261/106; 261/110; 261/97
(58) Field of Search ..................... 202/158, 83; 261/19, 261/97, 103, 106, 110; 196/111, 135; 159/27.5, 43.1; 62/238.5

(56) References Cited

U.S. PATENT DOCUMENTS

| 3,849,232 A | * | 11/1974 | Kessler et al. ................ 159/43 |
| 3,929,421 A | * | 12/1975 | Werges ...................... 23/288.7 |
| 4,776,989 A |   | 10/1988 | Harper et al. ................ 202/158 |
| 4,808,350 A | * | 2/1989  | Robbins et al. ................ 261/96 |
| 4,816,191 A | * | 3/1989  | Berven et al. ................. 261/97 |
| 5,132,055 A | * | 7/1992  | Alleaume et al. .............. 261/97 |
| 5,770,020 A | * | 6/1998  | Koistinen et al. ........... 159/43.1 |
| 5,904,807 A | * | 5/1999  | Ramm-Schmidt et al. . 159/43.1 |
| 6,149,136 A | * | 11/2000 | Armstrong et al. ........... 261/19 |

FOREIGN PATENT DOCUMENTS

| DE | 1 113 680 |   | 9/1961 |
| GB | 2 039 779 |   | 8/1980 |
| GB | 2 062 489 |   | 5/1981 |
| NL | 7415131   | * | 5/1975 |

* cited by examiner

Primary Examiner—Virginia Manoharan
(74) Attorney, Agent, or Firm—Young & Thompson

(57) ABSTRACT

This distributor (1) includes:
  a primary distributor (3) which delimits a closed volume provided with liquid predistribution openings (8) which open into the column;
  a device for feeding the primary distributor (3) with liquid under a pressure very much greater than the internal pressure of the column; and
  a secondary distributor (4) which occupies substantially the entire cross-section of the column, which includes a gas overhead in communication with the internal space of the column and which is subdivided by partitions (13, 17) into a plurality of compartments (16), each of which receives liquid originating from at least one of the said openings (8) of the primary distributor (3), this secondary distributor (4) having a bottom (9) provided with orifices (12) for fine distribution of the liquid over virtually the entire cross-section of the column, the number of these orifices being very much greater than the number of openings (8) of the primary distributor.

Application to the distillation of air on floating oil platforms or on barges.

12 Claims, 1 Drawing Sheet

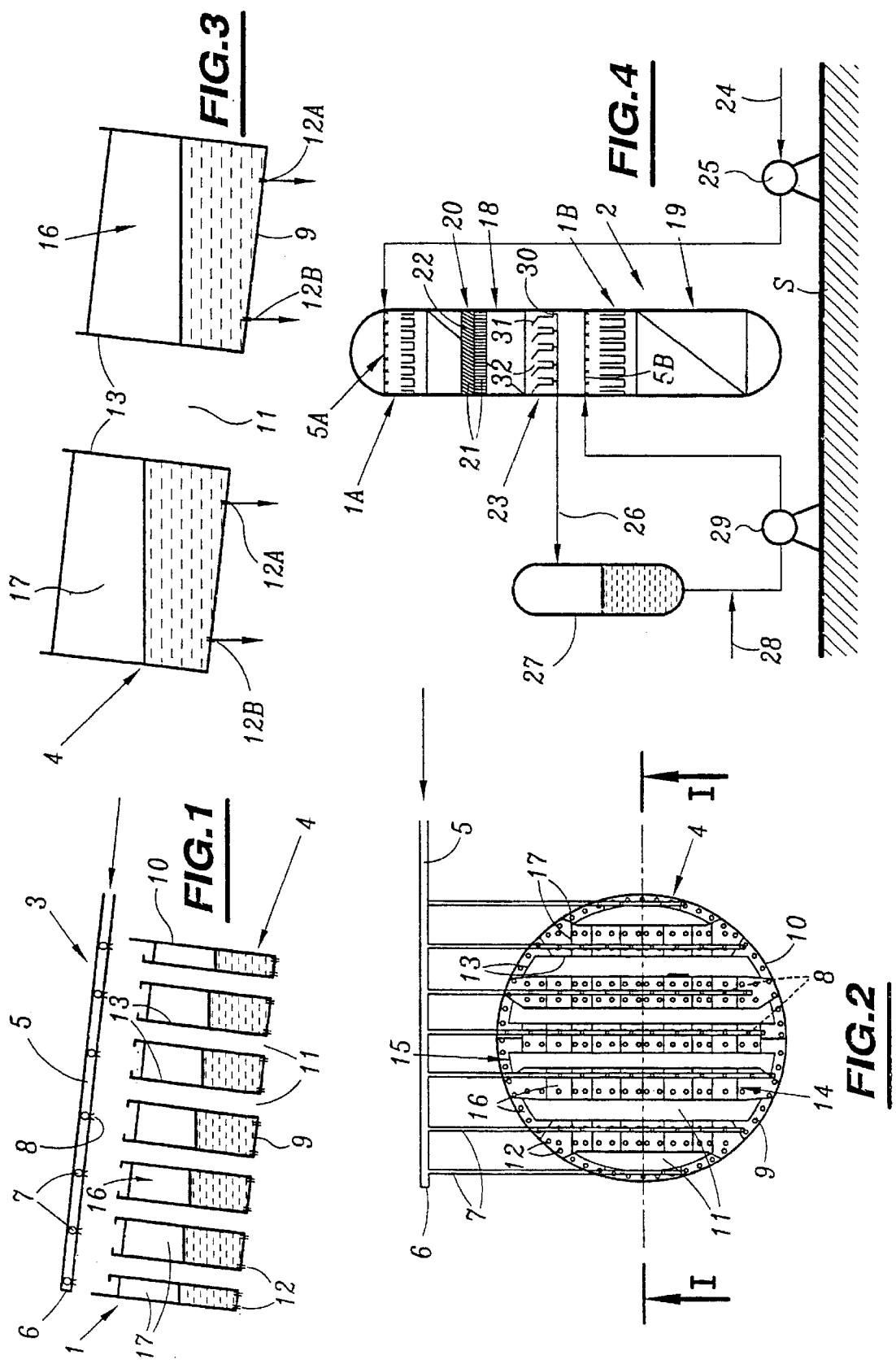

– 1 –

LIQUID DISPENSER FOR DISTILLING COLUMN, AND CORRESPONDING DISTILLING COLUMN

BACKGROUND OF THE INVENTION

The present invention relates to a liquid distributor for distillation column. It applies in particular to the air distillation columns on board floating structures such as floating oil platforms or barges.

The pressures referred to below are absolute pressures.

DESCRIPTION OF THE RELATED ART

Floating oil platforms produce residual gases. For economic and environmental reasons, it is becoming more and more necessary to recover these gases. One method consists in converting them into heavier hydro-carbons, which are in liquid form and are therefore easier to transport, using the Fischer-Tropsch process which consumes large amounts of oxygen.

It would therefore be beneficial to be able to install an air distillation column on board a floating platform or a barge, but proper operation of equipment of this type is compromised by serious difficulties. Specifically, a first imperative is for the liquid to be distributed uniformly at the column head over the entire cross-section of the latter, despite the oscillations of its axis due to the motion of the waves.

SUMMARY OF THE INVENTION

The object of the invention is to provide a liquid distributor whose operation has very little sensitivity to oscillations of this type.

To that end, the invention relates to a liquid distributor for distillation columns, characterized in that it comprises:

- a primary distributor which delimits a closed volume provided with liquid predistribution openings which open into the column;
- means for feeding the primary distributor with liquid under a pressure substantially greater than the internal pressure of the column; and
- a secondary distributor which occupies substantially the entire cross-section of the column, which includes a gas overhead in communication with the internal space of the column and which is subdivided by partitions into a plurality of compartments, each of which receives liquid originating from at least one of the said openings of the primary distributor, this secondary distributor having a bottom provided with orifices for fine distribution of the liquid over virtually the entire cross-section of the column, the number of these orifices being very much greater than the number of openings of the primary distributor.

The distributor according to the invention may have one or more of the following characteristics:

- each compartment receives liquid from a single opening of the primary distributor;
- all the compartments have substantially the same area and the same perforation factor;
- the primary distributor comprises an array of perforated tubes;
- the array of perforated tubes comprises a series of parallel perforated tubes, each of which is plumb with a straight funnel of the secondary distributor;
- the said feed means comprise a phase separator and a compression and feed conduit connected upstream to the lower part of this separator;

– 2 –

- the feed means pass through a supercooler.

The invention also relates to a distillation column comprising a distributor as defined above.

In one embodiment of such a distillation column, the said liquid distributor is arranged at a first level of the column, in particular at the column head, and the column includes, at at least one second level, liquid collection means on top of a second liquid distributor as defined above whose primary distributor is connected to second means for compressing the liquid collected.

BRIEF DESCRIPTION OF THE DRAWINGS

An embodiment of the invention will now be described with reference to the appended drawing, in which:

FIG. 1 schematically represents a vertical section, on the line I—I in FIG. 2, of a liquid distributor according to the invention;

FIG. 2 is a schematic plan view of this distributor;

FIG. 3 is a partial view similar to FIG. 1, on a larger scale; and

FIG. 4 schematically illustrates an air distillation column according to the invention, on board a floating structure.

DESCRIPTION OF THE PREFERRED EMBODIMENT

The distributor 1 represented in FIGS. 1 and 2 is intended to be mounted at the head of an air distillation column 2 which is schematized in FIG. 4 as being the low-pressure column of a double air distillation column.

The distributor 1 consists of two parts, namely a primary distributor 3 and a secondary distributor 4 which is arranged underneath.

The primary distributor 3 consists of a tube 5 which forms a feed manifold and is closed at one end 6 from where a plurality of mutually parallel perforated horizontal tubes 7, closed off at their opposite end from the manifold, lead off perpendicularly. On its lower generatrix, each tube 7 has a plurality of calibrated orifices 8, all of which are identical and whose diameter is between 2 and 5 mm.

In the example which is represented, seven tubes 7 are provided, and there are four orifices 8 for the two extreme tubes, twelve for the central tube and ten for the four other tubes. In any case, the total number n of orifices of the tubes 7 is very much less than the number N of liquid distribution holes needed to ensure sufficiently uniform distribution of the liquid over the cross-section of the column 2, this number N being typically of the order of 1000 to 3000 for a column with a diameter of 4 m. Furthermore, the diameter of the orifices 8 is sufficient to prevent any risk of obstruction by impurities contained in the liquid to be distributed.

The secondary distributor 4 has a dish which is open at the top, has a horizontal bottom 9 and a cylindrical peripheral wall 10 which rises from this bottom. The bottom 9 has six slots 11 with a shape elongated in the direction parallel to the tubes 7, which leave free, on the one hand, a peripheral annular ring and, on the other hand, five strips parallel to the said direction. This ring and these strips are perforated by the N aforementioned holes 12, which, like the orifices 8, have a sufficient diameter to prevent any risk of obstruction.

Each slot 11 is surrounded in full by a vertically rising wall 13 which, with the peripheral wall 10, delimits five straight funnels 14 plumb with the aforementioned strips and a peripheral annular funnel 15 which communicates with all the funnels 14.

Furthermore, the funnels 14 and 15 are all subdivided into compartments 16 by a set of vertical walls 17 which extend between the walls 13 and between the latter and the peripheral wall 10.

The compartments 16 all have the same area and the same perforation factor, and each of them is below one and only one orifice 8.

The column 2 is fixed on a floating structure S, schematized in FIG. 4, as is the medium-pressure column of the double distillation column (not shown). FIG. 4 only shows the elements which help in understanding the present invention, although the double column obviously has all the elements which are conventional in the art.

More particularly, the column 2 is subdivided into an upper distillation section 18 and a lower distillation section 19, both consisting of cross-corrugated packing. As is well known, this type of packing includes superposed cross-corrugated packing sections or packs 20, each of which is in the form of a cylindrical slab occupying the entire cross-section of the column.

Each pack 20 consists of a stack of corrugated strips 21 with oblique corrugations 22. Each strip has a vertical general plane, all the strips have the same height, and the corrugations are alternatively inclined in one direction and in the other from one strip to the next. The corrugations of adjacent strips thus touch at a large number of intersection points. Furthermore the packs 20 are off set angularly by 90° from one pack to the next relative to the general axis of the column. Above the upper section 18, the column contains a distributor as described above, which is the head distributor 1A of the column. Below the section 18, the column contains a device 23 for collecting the liquid delivered by this distillation section. A second distributor as defined above, which constitutes an intermediate distributor 1B, is arranged below this device 23 and above the distillation section 19.

In service, "lean liquid" (almost pure nitrogen drawn from the head of the medium-pressure column) which arrives via a feed conduit 24 is compressed to a pressure of the order of 3 bar by a pump 25 then introduced into the feed manifold 5A of the distributor 1A. This liquid has its pressure reduced to of the order of 1.2 bar through the orifices 8 and falls into the respective compartments 16. From there, it falls into through the set of holes 12 onto the upper pack 20 of the distillation section 18.

The oxygen-enriched liquid delivered by this section 18 is collected by the device 23, exits the column through a conduit 26, and is sent to a phase separator 27. The liquid gathered in the latter is mixed with "rich liquid" of the same composition (oxygen-enriched air collected from the base of the medium-pressure column) obtained from the medium-pressure column via a conduit 28. This liquid is then compressed to the aforementioned pressure in the feed manifold 5B of the distributor 1B. From there, this liquid has its pressure reduced and is distributed in two steps as before, in order to provide the reflux of the lower distillation section 19.

Of course, the liquid descending in the column 2 is in exchange contact as regards matter and heat with the oxygen gas obtained by heating liquid oxygen, collected from the base of the column 2, through nitrogen gas from the head of the medium-pressure column. This gas becomes progressively enriched with nitrogen as it rises in the column 2.

The gas flows have not been represented in FIG. 4 for the sake of clarity. However, it will be understood that the rising gas passes without difficulty through the distributors 1A and 1B via the slots 11 thereof. Similarly, the manifold device 23 includes passages permitting this upward free passage. In fact, it consists of a series of straight funnels 30, each of which has a side wall extended obliquely upwards at 31 to cover the gap separating it from the neighbouring funnel, while leaving free a passage 32 for the gas.

When the structure 18 is at sea, the axis of the column 2 oscillates about its normally vertical position. The terms "horizontal" and "vertical", used above to describe the distributor 1 should be understood as referring to this central position of the column, but when the latter is inclined, the bundle of tubes 7, the bottom 9 and the walls 10, 13 and 17 become inclined by the same angle, as represented in FIGS. 1 and 3.

By virtue of the pressurization of the liquid in the primary distributor 3, everything happens as if the orifices 8 had a depth of liquid of the order of 20 m above them, but of course without the corresponding vertical encumbrance. Consequently, the variations in height between the most extreme orifices 8 have very little effect on the flow rates provided by these orifices.

Furthermore, in each compartment 16, the small distance separating the holes 12 (FIG. 3) has the result that the depth of liquid above them varies little from one hole to the other. It will further be noted that, at any time, the strongly fed holes 12A are close to weakly fed holes 12B of an adjacent compartment, so that these two flow rates are readily compensated in the same region of the upper pack 20 of the distillation section lying immediately below.

In total, distribution of the liquid with satisfactory uniformity is obtained over the entire cross-section of the column, even if the column is relatively strongly inclined.

In order to avoid flash phenomena (formation of vapour) when the pressure of the liquid is reduced in the orifices 8, it is advantageous to supercool the compressed liquid, using any suitable means, in particular by heat exchange with a colder fluid available in the distillation plant. This fluid may be impure nitrogen delivered by the head of the column and/or liquid nitrogen under pressure lower than that of the liquid in question.

Furthermore, the compression of the liquid to be distributed may be brought about, with or without a pump depending on the case, by using a hydrostatic depth. The liquid is then raised to a phase separator located at a suitable level. To this end, it is possible to resort to an entrainment gas available under a sufficiently high pressure and/or a thermosyphon effect by partially vaporizing the liquid in a heat exchanger.

As will be understood, the invention also applies to reflux liquid distribution in a column which is fixed but whose axis is not perfectly vertical.

WO-A-90/10 497 describes, amongst others, packing which is similar to the aforementioned cross-corrugated packing but is perforated in a different way. The term "cross-corrugated packing" used here also comprises such packing, as well as any similar packing.

What is claimed is:

1. Liquid distributor for distillation column, comprising:
   a primary liquid distributor which delimits a closed volume provided with liquid predistribution openings which open into the column;
   means for feeding the primary liquid distributor with liquid under a pressure greater than the internal pressure of the column; and
   a secondary liquid distributor which occupies substantially the entire cross-section of the column, which includes a gas overhead in communication with an interior of the column and which is subdivided by partitions into a plurality of compartments, each of which compartments receives liquid originating from at least one of the openings of the primary liquid distributor, said secondary liquid distributor having a bottom provided with orifices for distribution of the liquid over virtually the entire cross-section of the column, the number of these orifices being greater than the number of openings of the primary distributor.

2. Liquid distributor according to claim 1, wherein each compartment receives liquid from a single opening of the primary liquid distributor.

3. Liquid distributor according to claim 1, wherein all the compartments have substantially the same area and the same perforation factor.

4. Liquid distributor according to claim 1, wherein the primary liquid distributor comprises an array of perforated tubes.

5. Liquid distributor according to claim 4, wherein the array of perforated tubes comprises a series of parallel perforated tubes, each of which is plumb with a straight funnel of the secondary liquid distributor.

6. Liquid distributor according to claim 1, wherein said feed means comprise a phase separator and a feed conduit performing compression and feed, the feed conduit having its upstream end connected to the lower part of said separator.

7. Liquid distributor according to claim 1, wherein the feed means pass through a supercooler.

8. Distillation column, comprising: at least one distillation section; and
   a liquid distributor located above the distillation section, the liquid distributor comprising
   a primary liquid distributor which delimits a closed volume provided with liquid predistribution openings which open into the column;
   means for feeding the primary liquid distributor with liquid under a pressure greater than the internal pressure of the column; and
   a second liquid distributor which occupies substantially the entire cross-section of the column, which includes a gas overhead in communication with an interior of the column and which is subdivided by partitions into a plurality of compartments, each of which compartments receives liquid originating from at least one of the openings of the primary liquid distributor, said secondary liquid distributor having a bottom provided with orifices for distribution of the liquid over virtually the entire cross-section of the column, the number of these orifices being greater than the number of openings of the primary liquid distributor.

9. Distillation column according to claim 8, wherein said liquid distributor is arranged at a first level of the column, and the column includes, at least one second level, liquid collection means on top of an additional liquid distributor comprising:
   an additional primary liquid distributor which delimits a closed volume provided with additional liquid predistribution openings which open into the column;
   means for feeding the additional primary liquid distributor with liquid under a pressure substantially greater than the internal pressure of the column; and
   an additional secondary liquid distributor which occupies substantially the entire cross-section of the column, which includes an additional gas overhead in communication with the internal space of the column and which is subdivided by additional partitions into a plurality of additional compartments, each of which receives liquid originating from at least one of said additional openings, said additional secondary liquid distributor having an additional bottom provided with additional orifices for distribution of the liquid over virtually the entire cross-section of the column, the number of said additional orifices being greater than the number of said additional openings;
   said additional primary liquid distributor of said liquid distributor being connected to second means for compressing the liquid collected by said liquid collection means.

10. Distillation column according to claim 9, wherein said liquid distributor is arranged at the column head.

11. Liquid distillation column according to claim 8, wherein said column is on board a floating structure.

12. Liquid distillation column according to claim 11, wherein said floating structure is a floating oil platform or a barge.

* * * * *